United States Patent
Kaminsky et al.

(10) Patent No.: US 7,563,740 B2
(45) Date of Patent: Jul. 21, 2009

(54) DIRECT EPOXIDATION PROCESS

(75) Inventors: Mark P. Kaminsky, Media, PA (US); Edward T. Shawl, Wallingford, PA (US); Steven M. Augustine, Ellicott City, MD (US)

(73) Assignee: Lyondell Chemical Technology, L.P., Greenville, DE (US)

(*) Notice: Subject to any disclaimer, the term of this patent is extended or adjusted under 35 U.S.C. 154(b) by 378 days.

(21) Appl. No.: 11/641,317

(22) Filed: Dec. 19, 2006

(65) Prior Publication Data

US 2008/0146826 A1    Jun. 19, 2008

(51) Int. Cl.
*B01J 37/08* (2006.01)
*B01J 29/068* (2006.01)
*C07D 301/06* (2006.01)

(52) U.S. Cl. .................. 502/74; 502/60; 549/533; 549/532

(58) Field of Classification Search .......... 502/60, 502/74; 549/533, 532
See application file for complete search history.

(56) References Cited

U.S. PATENT DOCUMENTS

| | | | |
|---|---|---|---|
| 4,039,474 A | 8/1977 | Feistel et al. | |
| 4,119,474 A | 10/1978 | Whitman et al. | |
| 4,410,501 A | 10/1983 | Taramasso et al. | |
| 4,833,260 A | 5/1989 | Neri et al. | |
| 4,888,319 A | 12/1989 | Daamen et al. | |
| 5,393,343 A | 2/1995 | Darwin et al. | |
| 5,623,090 A | 4/1997 | Haruta et al. | |
| 6,008,388 A | 12/1999 | Dessau et al. | |
| 6,034,208 A | 3/2000 | McDaniel et al. | |
| 6,139,623 A | 10/2000 | Darwin et al. | |
| 6,214,958 B1 | 4/2001 | Le-Khac et al. | |
| 6,362,349 B1 | 3/2002 | Kuperman et al. | |
| 6,455,711 B1 | 9/2002 | Eller et al. | |
| 6,498,259 B1 | 12/2002 | Grey et al. | |
| 6,551,546 B1 | 4/2003 | Grosch et al. | |
| 6,646,142 B1 | 11/2003 | Meima et al. | |
| 6,680,406 B2 | 1/2004 | Harmer et al. | |
| 6,706,658 B2 | 3/2004 | White | |
| 6,815,513 B2 | 11/2004 | Le-Khac et al. | |
| 6,849,570 B2 | 2/2005 | Hasenzahl et al. | |
| 7,074,944 B2 | 7/2006 | Steinbrenner et al. | |
| 7,122,494 B2 * | 10/2006 | Ou et al. | 502/64 |

FOREIGN PATENT DOCUMENTS

| | | |
|---|---|---|
| BE | 1001038 A7 | 6/1989 |
| JP | 4-352771 | 12/1992 |

OTHER PUBLICATIONS

R. Szostak, "Non-aluminosilicate Molecular Sieves", in Molecular Sieves: Principles of Synthesis and Identification (1989) p. 205, Van Nostrand Reinhold.
G. Vayssilov, "Structural and Physicochemical Features of Titanium Silicalites" in Catal. Rev.-Sci. Eng., (1997) p. 209 vol. 39(3).
C. Capes, "Particle Size Enlargement", in Handbook of Powder Technology (1980) p. 112, vol. 1, Elsevier Scientific Publishing Company.
"Chapter 2. Clay as Potential Catalyst Material" in Zeolite, Clay, and Heteropoly Acid in Organic Reactions (1992) p. 49, Kodansha, Ltd.
T. Healy, "Stability of Aqueous Silica Sols", in The Collid Chemistry of Silica (1994) p. 147, American Chemical Society.

* cited by examiner

*Primary Examiner*—David M Brunsmann
(74) *Attorney, Agent, or Firm*—Yuanzhang Han

(57) ABSTRACT

A catalyst comprising a transition metal zeolite and a noble metal is disclosed. The catalyst is prepared by an extrusion method using a comb-branched polymer as an extrusion aid. The catalyst is used in a reaction to produce epoxide from an olefin, hydrogen, and oxygen. The comb-branched polymer improves the mechanical properties of the extrudate.

23 Claims, No Drawings

DIRECT EPOXIDATION PROCESS

FIELD OF THE INVENTION

The invention relates to a catalyst comprising a transition metal zeolite and a noble metal. The catalyst is prepared by an extrusion method using a comb-branched polymer as an extrusion aid. The catalyst is used to produce an epoxide from an olefin, hydrogen, and oxygen.

BACKGROUND OF THE INVENTION

Direct epoxidation of higher olefins (containing 3 or more carbon atoms) such as propylene with oxygen and hydrogen has been the focus of recent efforts. For example, the reaction may be performed in the presence of a catalyst comprising gold and a titanium-containing support (see, e.g., U.S. Pat. Nos. 5,623,090, 6,362,349, and 6,646,142), or a catalyst containing palladium and a titanium zeolite (see, e.g., JP 4-352771).

Mixed catalyst systems for olefin epoxidation with hydrogen and oxygen have also been disclosed. For example, Example 13 of JP 4-352771 describes the use of a mixture of titanosilicate and Pd-on-carbon for propylene epoxidation. U.S. Pat. No. 6,008,388 describes a catalyst comprising a noble metal and a titanium or vanadium zeolite, but additionally teaches that the Pd can be incorporated into a support before mixing with the zeolite. The catalyst supports disclosed include silica, alumina, and activated carbon. U.S. Pat. No. 6,498,259 discloses the epoxidation of an olefin with hydrogen and oxygen in a solvent containing a buffer in the presence of a catalyst mixture containing a titanium zeolite and a noble metal catalyst.

The direct epoxidation may be performed in a slurry or a fixed bed (see, e.g., U.S. Pat. No. 6,498,259). In a slurry process, the liquid product stream needs to be separated from the solid catalyst particles. Separation is often troublesome. In contrast, the product stream is easily separated from the catalyst in a fixed-bed process. However, a fixed-bed process requires the catalyst have sufficient mechanical strength against crushing.

Extrudates, which are commonly used as catalysts in fixed bed reactions, are often prepared in the presence of extrusion aids to facilitate extrusions and to improve their mechanical and physical properties (see, e.g., U.S. Pat. Nos. 4,039,474, 4,888,319, 4,119,474, and 6,706,658).

SUMMARY OF THE INVENTION

The invention is a catalyst comprising a transition metal zeolite and a noble metal, wherein the catalyst is prepared by an extrusion method using a comb-branched polymer as an extrusion aid. The catalyst is used to produce an epoxide from an olefin, hydrogen, and oxygen. The comb-branched polymer improves the mechanical properties of the extrudate. The invention includes methods for making the catalyst and an epoxidation process that uses the catalyst.

DETAILED DESCRIPTION OF THE INVENTION

In one aspect, the invention is a catalyst comprising a transition metal zeolite and a noble metal, wherein the catalyst is prepared by an extrusion method using a comb-branched polymer as an extrusion aid.

Zeolites are microporous crystalline solids with well-defined structures. Generally they contain one or more of Si, Ge, Al, B, P, or the like, in addition to oxygen. Many zeolites occur naturally as minerals and are extensively mined in many parts of the world. Others are synthetic and are made commercially for specific uses. Zeolites have the ability to act as catalysts for chemical reactions that take place mostly within the internal cavities of the zeolites. Transition metal zeolites are zeolites comprising transition metals in their framework. A transition metal is a Group 3-12 element. The first row of them are from Sc to Zn. Preferred transition metals are Ti, V, Mn, Fe, Co, Cr, Zr, Nb, Mo, and W. More preferred are Ti, V, Mo, and W. Most preferred is Ti.

Preferred titanium zeolites are titanium silicates (titanosilicates). Preferably, they contain no element other than titanium, silicon, and oxygen in the lattice framework (see R. Szostak, "Non-aluminosilicate Molecular Sieves," in *Molecular Sieves: Principles of Synthesis and Identification* (1989) Van Nostrand Reinhold, pp. 205-82). Small amounts of impurities, e.g., boron, iron, aluminum, sodium, phosphorous, copper, and the like, and mixtures thereof, may be present in the lattice. The amount of impurities is preferably less than 0.5 wt. %, more preferably less than 0.1 wt. %. Preferred titanium silicates will generally have a composition corresponding to the following empirical formula: $xTiO_2 \cdot (1-x)SiO_2$, where x is between 0.0001 and 0.5000. More preferably, the value of x is from 0.01 to 0.125. The molar ratio of Si:Ti in the lattice framework of the zeolite is advantageously from 9.5:1 to 99:1, most preferably from 9.5:1 to 60:1. Particularly preferred titanium zeolites are titanium silicalites (see *Catal. Rev.-Sci. Eng.*, 39(3) (1997) 209). Examples of these include TS-1 (titanium silicalite-1, a titanium silicalite having an MFI topology analogous to that of the ZSM-5 aluminosilicate), TS-2 (having an MEL topology analogous to that of the ZSM-11 aluminosilicate), and TS-3 (as described in Belgian Pat. No. 1,001,038). Titanium zeolites having framework structures isomorphous to zeolite beta, mordenite, and ZSM-12 are also suitable for use. The most preferred is TS-1.

A transition metal zeolite is generally prepared in the presence of an organic templating agent (see, e.g., U.S. Pat. No. 6,849,570). Suitable templating agents include alkyl amines, quaternary ammonium compounds, and the like. When a zeolite is crystallized, it usually contains an organic templating agent within its pores. Zeolites containing templating agents may be directly used to form extrudates without being calcined. Alternatively, a calcined zeolite, which generally contains <0.5 wt. % C, preferably <0.1 wt. % C, is used.

The catalyst comprises a noble metal. Suitable noble metals include, e.g., gold, silver, platinum, palladium, iridium, ruthenium, rhenium, rhodium, osmium, and mixtures thereof. Any of the noble metals can be used, either alone or in combination. Particularly desirable noble metals include palladium, gold, and mixtures of both.

There are no particular restrictions regarding the choice of the noble metal compound or complex used as the source of the noble metal. Suitable compounds include nitrates, sulfates, halides (e.g., chlorides, bromides), carboxylates (e.g., acetate), and amine or phosphine complexes of noble metals (e.g., palladium(II) tetraammine bromide, tetrakis(triphenylphosphine) palladium).

Similarly, the oxidation state of the noble metal is not critical. Palladium, for instance, may be in an oxidation state anywhere from 0 to +4 or any combination of such oxidation states. To achieve the desired oxidation state or combination of oxidation states, the noble metal compound after being introduced in the catalyst may be fully or partially pre-reduced.

The weight ratio of the transition metal zeolite to noble metal is not particularly critical. However, a transition metal zeolite to noble metal ratio of 10:1 to 2000:1 (grams of transition metal zeolite per gram of noble metal) is preferred.

The catalyst is prepared by an extrusion method using a comb-branched polymer as an extrusion aid. Extrusion is a manufacturing process in which a material is pushed through a die or an orifice to create long objects of a fixed cross-section, which are called extrudates. Extrusion is commonly used in forming adsorbents and catalysts. Any conventional extruder may be used. The extrudate usually has a diameter of 0.5 to 10 mm, in particular from 1 to 5 mm. A suitable screw-type extruder is described in "Particle size enlargement," *Handbook of Powder Technology*, vol. 1 (1980), pp. 112-22.

An extrusion aid helps the mixing, mulling, and extrusion, and may improve the physical properties of the extrudate such as mechanical strength, surface area, pore size, and pore volume. For example, an extrusion aid may promote the bridging of primary particles (transition metal zeolite, and inorganic oxides if used) during the kneading, extruding, and drying steps and/or ensure the mechanical stability of an extrudate during extrusion and calcination. An extrusion aide may also help to disperse a solvent, if used, more uniformly in a paste, as shown by comparing Examples 6 and 7.

The comb-branched polymer comprises a polymer backbone, a carboxylic side-chain, and a polyether side-chain. The carboxylic side-chain may comprise a carboxylic acid, a carboxylate salt, or mixtures of both. The preferred carboxylic side chain is a carboxylic acid group (—COOH).

The polyether side-chain is preferably represented by

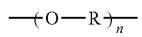

wherein n is from 3 to 500, more preferably from 10 to 250; and R is an organic moiety containing a carbon atom linked to the oxygen through a single covalent bond. The polyether may contain two or more different repeating units containing different R moieties. R may be an aromatic group or an aliphatic group. Saturated aliphatic groups are preferred. Particularly preferred are alkylene groups such as ethylene, propylene, 1,4-butylene, isopropylene, or isobutylene; most preferred are ethylene and propylene. The preferred polyethers are accordingly polyoxyalkylene, e.g., polyoxyethylene, polyoxypropylene, and oxypropylene/oxyethylene copolymers.

The polyether side-chain may be attached to the backbone of the comb-branched polymer by any suitable chemical linkage. The linkage may be an ester, amide, imide, ether, amine, or thioether functionality, or a carbon-carbon bond. Preferably, the polyether side-chains are attached to the polymer backbone through an ester, amide, or imide functionality, as in the comb-branched polymer prepared by polymerizing acrylic acid and a polyether acrylate macromonomer (see below, also see U.S. Pat. No. 6,034,208) and in the polymer prepared by grafting a polyether amine to a poly(acrylic acid) (see, e.g., U.S. Pat. No. 5,393,343).

The molar ratio of carboxylic side-chains to polyether side-chains in the comb-branched polymer is not critical. Typically, the molar ratio is in the range of 1:1 to 200:1. Preferably, the ratio is in the range of 2:1 to 50:1.

Preferred comb-branched polymers comprise recurring units of an ethylenic carboxylic monomer and a polyether macromonomer. An ethylenic carboxylic monomer comprises a carbon-carbon double bond and a carboxylic group such as a carboxylic acid, a carboxylate salt, or a carboxylic anhydride. Suitable ethylenic carboxylic monomers contain from 3 to 10 carbon atoms. Examples includes acrylic acid, methacrylic acid, crotonic acid, vinylacetic acid, 4-pentenoic acid, maleic acid, maleic anhydride, itaconic acid, mesaconic acid, fumaric acid, citraconic acid, and mixtures thereof. Preferably, the ethylenic carboxylic monomer is an acrylic, e.g., acrylic acid, methacrylic acid, maleic acid, maleic anhydride, fumaric acid, and mixtures thereof. More preferably, it is acrylic acid, methacrylic acid, or a mixture of both.

Suitable polyether macromonomers have a polyether chain and a carbon-carbon double bond, which can be either at the end of or within the polyether chain. Examples include polyether monoacrylates, polyether monomethacrylates, polyether monoallyl ethers, polyether monomaleates, and polyether monofumarates. The polyether portion of the macromonomer can be an alkylene oxide polymer having a number average molecular weight (Mn) within the range of about 500 to about 10,000. Suitable alkylene oxides include ethylene oxide, propylene oxide, 1,2-butylene oxides, and the like, and mixtures thereof. The polyether macromonomers preferably have from 0 to 5 hydroxy groups. The polyether macromonomer can be a linear or a branched polymer, a homopolymer or a copolymer, and a random or a block copolymer.

Examples of polyether macromonomers are poly(propylene glycol) acrylates or methacrylates, poly(ethylene glycol) acrylates or methacrylates, poly(1,4-butylene glycol) acrylates or methacrylates, poly(ethylene glycol) methyl ether acrylates or methacrylates, acrylates or methacrylates of an oxyethylene and oxypropylene block or random copolymer, poly(propylene glycol) allyl ethers, poly(ethylene glycol) allyl ethers, poly(propylene glycol) monomaleates, and the like, and mixtures thereof. Preferred polyether macromonomers are poly(propylene glycol) acrylates or methacrylates, poly(ethylene glycol) acrylates or methacrylates, and acrylates or methacrylates of an oxyethylene and oxypropylene copolymer. More preferred are acrylates or methacrylates of an oxyethylene/oxypropylene copolymer.

The polyether macromonomer can be prepared by the oxyalkylation of an olefinic substrate containing a hydroxy or carboxylic acid group with one or more alkylene oxides in the presence of a catalyst as described in U.S. Pat. No. 6,034,208, the teachings of which are incorporated herein by reference. In another example, poly(1,4-butylene glycol) allyl ether is prepared by polymerization of tetrahydrofuran in the presence of allyl alcohol and a base catalyst such as potassium hydroxide or sodium hydroxide. A solid base catalyst may also be used (see, e.g., U.S. Pat. Nos. 6,680,406, 6,455,711, and 7,074,944).

The ratio of ethylenic carboxylic monomer to polyether macromonomer is generally within the range from 1:99 to 99:1 by weight. The preferred range is from 5:95 to 75:25.

Many methods can be used to prepare the comb-branched polymer. One method involves copolymerizing an ethylenic carboxylic monomer and a polyether macromonomer (see U.S. Pat. Nos. 6,034,208 and 6,815,513). Preferably, the monomer is acrylic. More preferably, the monomer is acrylic acid, methacrylic acid, or a mixture of both.

When a comb-branched polymer is prepared by copolymerization of an ethylenic carboxylic monomer and a polyether macromonomer, other comonomers may be copolymerized. The comonomers include olefins, vinyl aromatics, vinyl halides, vinyl ethers, vinyl esters, vinyl pyrrolidinones, conjugated dienes, unsaturated sulfonic acids, unsaturated phosphonic acids, and the like, and mixtures thereof. The amount of comonomer used is generally <50 wt. %, preferably <20 wt. % of the total amount of monomers. Methods for preparing comb-branched polymers are described in U.S. Pat. Nos. 6,214,958 and 6,815,513, the teachings of which are incorporated herein by reference.

Another suitable method for preparing the comb-branched polymer is to react a carboxylic polymer with a polyether amine. A carboxylic polymer is a polymer that comprises carboxylic side-chains, including carboxylic acids, carboxylate salts, and carboxylic anhydrides. Examples of carboxylic polymers are homo or copolymers of ethylenic carboxylic monomers, e.g., acrylic, methacrylic, maleic, fumaric, citraconic, itaconic acids, or dicarboxylic acid monoesters. Homo or copolymers of acrylic acid or methacrylic acid are preferred. The carboxylic polymer may contain units derived from other ethylenic monomers, such as styrene, alpha-methylstyrene, sulfonated styrene, maleic acid, acrylonitrile, butadiene, and the like. Such other ethylenic monomer derived units, when present, can be up to 20 wt. %, preferably, up to 10 wt. % of the total polymer.

Polyether amines are used to graft the carboxylic polymer to form the desired comb-branched polymer. A polyether amine comprises an amine group within the polymer backbone or as an end group. The methods of making comb-branched polymers by grafting a polyether amine to a carboxylic polymer are disclosed in U.S. Pat. Nos. 5,393,343 and 6,139,623, the teachings of which are herein incorporated by reference.

The amount of the comb-branched polymer contained in the extrudate may generally be from 0.1 wt. % to 30 wt. %, preferably from 1 wt. % to 20 wt. %.

In addition to the comb-branched polymer, other extrusion aids may be used. Examples of known extrusion aids include alkyl amines, carboxylic acids, alkyl ammonium compounds, amino alcohols, cellulose, cellulose ethers, starch, polyacrylates, polymethacrylates, poly(vinyl alcohol)s, poly(vinylpyrrolidone)s, poly(amino acid)s, polyethers, and poly(tetrahydrofuran)s, and metal carboxylates. Extrusion aids are usually removed during calcination. When a metal carboxylate is used as an extrusion aid, the metal (e.g., its oxide) may be incorporated into the extrudate.

The catalyst may further comprise an inorganic oxide. The inorganic oxide may help to improve the mechanical strength or the physical properties of the extrudate (e.g., crushing strength, surface area, pore size, pore volume). Sometimes the inorganic oxide can modify the chemical properties (e.g., acidity, basicity) of the zeolite and its catalytic activities. Suitable inorganic oxides include metal oxides, non-metal oxides, mixed oxides, clays, and the like. Examples of inorganic oxides include silicas, aluminas, titanias, zirconias, magnesias, silica-aluminas, silica-titanias, montmorillonites, kaolins, bentonites, halloysites, dickites, nacrites, and anauxites, and the like, and mixtures thereof. Examples of clays can be found in "Chapter 2. Clay as Potential Catalyst Material," *Zeolite, Clay, and Heteropoly Acid in Organic Reactions* (1992) Kodansha Ltd., Tokyo. Preferred inorganic oxides are silicas, aluminas, titanias, zirconias, magnesias, silica-aluminas, silica-titanias, kaolins, and mixtures thereof. More preferred are silicas, aluminas, titanias, and mixtures thereof.

The weight ratio of the transition metal zeolite to the inorganic oxide may typically be from 100:1 to 1:100, preferably from 10:1 to 1:10.

In another aspect, the invention is a catalyst preparation method comprising an extrusion process using a comb-branched polymer as an extrusion aid. Depending on the manner in which the noble metal is introduced to the extrudates, various methods may be used.

In one approach, the method comprises (a) extruding a mixture comprising a transition metal zeolite, a noble metal, and a comb-branched polymer to produce a polymer-containing extrudate; and (b) calcining the polymer-containing extrudate in an oxygen-containing atmosphere. A noble metal source (e.g., a noble metal compound) may be directly added in the mixture. Alternatively, the noble metal may be supported on the transition metal zeolite by standard techniques including impregnation, ion exchange, adsorption, precipitation, and the like.

A second method of catalyst preparation comprises (a) extruding a mixture comprising a transition metal zeolite, a noble metal, an inorganic oxide, and a comb-branched polymer to produce a polymer-containing extrudate, wherein the noble metal is supported on the inorganic oxide; and (b) calcining the polymer-containing extrudate in an oxygen-containing atmosphere. The noble metal may be supported on the inorganic oxide by standard techniques. Suitable and preferred inorganic oxides are described in the previous section.

A third method comprises (a) extruding a mixture comprising a transition metal zeolite and a comb-branched polymer to produce a polymer-containing extrudate; (b) supporting the noble metal on the polymer-containing extrudate to form an impregnated extrudate; and (c) calcining the impregnated extrudate in an oxygen-containing atmosphere. The noble metal may be supported on the polymer-containing extrudate by standard techniques. Preferably the polymer-containing extrudate is dried prior to supporting the noble metal.

A fourth method comprises (a) extruding a mixture comprising a transition metal zeolite and a comb-branched polymer to produce a polymer-containing extrudate; (b) calcining the polymer-containing extrudate in an oxygen-containing atmosphere to produce a calcined extrudate; and (c) supporting the noble metal on the calcined extrudate. The noble metal may be supported on the calcined extrudate by impregnation, adsorption, ion-exchange, and the like.

The above methods illustrate that the noble metal may be introduced in many ways.

The mixture may contain an inorganic oxide. Suitable and preferred inorganic oxides are described in the previous section. In addition, precursors of inorganic oxides may also be used. For example, silica may be introduced into the polymer-containing mixture as a silica sol (Healy, T. W., "Stability of Aqueous Silica Sols," in *The Colloid Chemistry of Silica* (1994) American Chemical Society), or in the form of tetraalkoxysilanes (an inorganic oxide precursor). Similarly, other inorganic oxide precursors such as orthosilicic esters, alkoxysilanes, alkoxytitanates, alkoxyaluminates, alkoxyzirconates can also be used. Specific examples are tetramethoxysilane, tetraethoxysilane, tetrapropoxysilane, and tetrabutoxysilane, and analogous tetraalkoxytitanium, tetraalkoxyzirconium, and trialkoxyaluminium compounds. Precursors are converted to the corresponding inorganic oxides during mixing, extrusion, or calcination.

In addition to the comb-branched polymer, the mixture may contain another extrusion aid. Suitable and preferred extrusion aids are described in the previous section.

Generally the mixture is turned into a stiff dough prior to extrusion. Many suitable methods can be used to mull or knead the mixture. The operation is generally carried out at temperatures in the range from 10 to 150° C., preferably at room temperature. The mulling or kneading may be performed under any pressure, preferably at 0.1-10 atm. Typically, it lasts for 2 min to 10 h.

If necessary, a solvent may be added to the mixture. Suitable solvents include water, alcohols, ethers, esters, amide, aromatic solvents, halogenated solvents, and the like, and the mixtures thereof. Preferred solvents are water, alcohols, and mixtures thereof. Water is the most preferred. The manner in which the solvent is introduced is not critical. For example, a solvent may be added to the mixture directly or introduced with other components.

The polymer-containing extrudate is optionally dried. The drying removes at least a portion of solvents (e.g., water, alcohols) from the extrudate. The extrudate may be dried at from 10 to 200° C. at atmospheric pressure or under vacuum. The drying may occur in air, an inert atmosphere, or a mixture of both.

The polymer-containing extrudate or the impregnated extrudate is calcined to produce a calcined extrudate. The calcination is carried out in an oxygen-containing atmosphere to burn off the organic materials (e.g., residual solvents, extrusion aids, templating agents) contained in the extrudate. The calcination may be carried out at 400 to 1000° C., more preferably from 450 to 700° C. Sometimes, it is beneficial to initially calcine the extrudate in an inert atmosphere to thermally decompose the organic compounds, and then burn off the organic materials in an oxygen-containing atmosphere. Generally, the extrudate after the calcination contain <0.5 wt. % carbon. Preferably, it contains <0.1 wt. % carbon.

The invention also includes an epoxidation process comprising reacting an olefin, hydrogen, and oxygen in the presence of a catalyst of the invention.

An olefin is used in the epoxidation process. Suitable olefins include any olefin having at least one carbon-carbon double bond, and generally from 2 to 60 carbon atoms. Preferably, the olefin is an acyclic alkene of from 2 to 30 carbon atoms; the process is particularly suitable for epoxidizing $C_2$-$C_6$ olefins. More than one double bond may be present in the olefin molecule, as in a diene or triene. The olefin may be a hydrocarbon or may contain functional groups such as halogen, carboxyl, hydroxyl, ether, carbonyl, cyano, or nitro groups, or the like. In a particularly preferred process, the olefin is propylene and the epoxide is propylene oxide.

Oxygen and hydrogen are required. Although any sources of oxygen and hydrogen are suitable, molecular oxygen and molecular hydrogen are preferred. The molar ratio of hydrogen to oxygen can usually be varied in the range of $H_2$:$O_2$=1:100 to 5:1 and is especially favorable at 1:5 to 2:1. The molar ratio of oxygen to olefin is usually 1:1 to 1:20, and preferably 1:1.5 to 1:10. Relatively high oxygen to olefin molar ratios (e.g., 1:1 to 1:3) may be advantageous for certain olefins.

In addition to the olefin, oxygen, and hydrogen, an inert gas is preferably used in the epoxidation process. Any desired inert gas can be used. Suitable inert gases include nitrogen, helium, argon, and carbon dioxide. Saturated hydrocarbons with 1-8, especially 1-6, and preferably 1-4 carbon atoms, e.g., methane, ethane, propane, and n-butane, are also suitable. Nitrogen and saturated $C_1$-$C_4$ hydrocarbons are preferred inert gases. Mixtures of inert gases can also be used. The molar ratio of olefin to gas is usually in the range of 100:1 to 1:10 and especially 20:1 to 1:10.

The epoxidation process is performed in a slurry or fixed bed. The fixed-bed process is preferred. The reaction mixture may be a gas, liquid, or a gas/liquid mixture. The epoxidation is carried out at a temperature effective to achieve the desired olefin epoxidation, preferably at temperatures in the range of 0-200° C., more preferably, 20-150° C. It is advantageous to work at a pressure of 1-200 bars.

A reaction solvent is preferably used in the epoxidation. Suitable reaction solvents are liquid under the reaction conditions. They include, for example, oxygen-containing hydrocarbons such as alcohols, aromatic and aliphatic solvents such as toluene and hexane, chlorinated aromatic and aliphatic solvents such as chlorobenzene and methylene chloride, nitriles such as acetonitrile, carbon dioxide, and water.

Suitable oxygenated solvents include alcohols, ethers, esters, ketones, carbon dioxide, water, and the like, and mixtures thereof. Preferred oxygenated solvents include water and lower aliphatic $C_1$-$C_4$ alcohols such as methanol, ethanol, isopropanol, tert-butanol, and mixtures thereof. Fluorinated alcohols can be used.

Where a reaction solvent is used, it may be advantageous to use a buffer. The buffer is employed in the reaction to inhibit the formation of glycols or glycol ethers during the epoxidation, and it can improve the reaction rate and selectivities. The buffer is typically added to the solvent to form a buffer solution, or the solvent and the buffer are added separately. Useful buffers include any suitable salts of oxyacids, the nature and proportions of which in the mixture are such that the pH of their solutions preferably ranges from 3 to 12, more preferably from 4 to 10, and most preferably from 5 to 9. Suitable salts of oxyacids contain an anion and a cation. The anion may include phosphate, carbonate, bicarbonate, sulfate, carboxylates (e.g., acetate), borate, hydroxide, silicate, aluminosilicate, or the like. The cation may include ammonium, alkylammonium (e.g., tetraalkylammoniums, pyridiniums), alkylphosphonium, alkali metal, and alkaline earth metal ions, or the like. Examples include $NH_4$, $NBu_4$, $NMe_4$, Li, Na, K, Cs, Mg, and Ca cations. The preferred buffer comprises an anion selected from the group consisting of phosphate, carbonate, bicarbonate, sulfate, hydroxide, and acetate; and a cation selected from the group consisting of ammonium, alkylammonium, alkylphosphonium, alkali metal, and alkaline earth metal ions. Buffers may preferably contain a combination of more than one suitable salt. Typically, the concentration of the buffer in the solvent is from 0.0001 M to 1 M, preferably from 0.0005 M to 0.3 M. The buffer may include ammonium hydroxide which can be formed by adding ammonia gas to the reaction system. For instance, one may use a pH=12-14 solution of ammonium hydroxide to balance the pH of the reaction system. More preferred buffers include alkali metal phosphates, ammonium phosphate, and ammonium hydroxide.

The following examples merely illustrate the invention. Those skilled in the art will recognize many variations that are within the spirit of the invention and scope of the claims.

EXAMPLE 1

Comb-Branched Polymer A

The reaction is carried out in a 1-L reaction kettle equipped with a stirrer, a temperature controller, a heating device, a nitrogen purge device and a product outlet. The outlet tube is set so that the reactor holds about 320 mL of material. There are three inlet addition pumps, one for the mixture of monomers in water, one for the initiator, and one for the chain-transfer agent. The product outlet tube leads into a second reactor that is equipped with a stirrer, a temperature controller, a heating device and a nitrogen purge device. The second reactor is sized to collect all product produced after the reaction has reached steady state. The first reactor is charged with 50 mL of water to cover the stirrer and the reactor is then purged with nitrogen for about 20 min. A mixture of a methacrylate of an oxyethylene/oxypropylene random copolymer having an oxyethylene/oxypropylene ratio of 70:30 by weight and a number average molecular weight of about 3,000 (900 g, 0.3 mol), acrylic acid (136 g, 1.83 mol), and water (610 g) is charged to the monomer feed tank. A product from a previous polymerization reaction (175 g) is charged to the reactor. The reactor is heated to 65° C. under a continuous nitrogen purge. The feed pumps are started with a feed rate of 150 g/h for the monomer feed, 28.5 mL/h for the initiator feed, and 30.5 mL/h for the chain transfer agent feed. The reactor effluent is diverted until the reaction has reached a steady state and then the product is collected in the second reactor for about 1 h. At the end of the period the second reactor is heated for another 3 h to complete the reaction. The product is designated as Polymer A (MW 45,000).

A sample of Polymer A is titrated with an aqueous ammonium hydroxide solution to obtain a sample designated as Polymer A-1 with pH=2.8. Polymer A-1 contains 43 wt. % solid.

EXAMPLE 2

Pd/Au-on-Titania (Catalyst B)

An aqueous $Na_2PdCl_4$ solution (19.74 wt. %, 2.77 g), an aqueous $NaAuCl_2$ solution (19.95 wt. %, 2.51 g), and DIUF water (deionized and ultrafiltered, obtained from Fisher, 250 g) are charged in a 500-mL round bottom flask. The above mixture is placed on a rotovap and mixed at 30 rpm for 0.5 h. To this solution, titania powder (DT-51A, Millennium Chemicals, 100 g) is added. The pH of this solution is 3.1. Additional DIUF water (20 g) is used to rinse residual titania from the funnel into the solution.

To this slurry, $NaHCO_3$ (15.87 g) is slowly added while it is mixed to raise the pH to 7.1. Gaseous $CO_2$ was emitted from the solution during the addition. The flask is then rotated at 30 rpm and 40° C. for 24 h under a slow nitrogen purge. Filtering above slurry gives a dark grey powder. The powder is dried in an oven at 60° C. for 21 h under a nitrogen purge, then further dried at 60° C. for 6.5 h under vacuum. The dried powder is calcined in a muffle furnace in air using the temperature program: 5° C./min ramp from 22° C. to 110° C., hold at 110° C. for 2 h, ramp 2° C./min from 110° C. to 400° C., hold at 400° C. for 8 h, cool to room temp. The calcined powder is placed on a pressure filter with 0.22 micron filter paper and washed with DIUF water until no chloride is detected in the washing solution (Cl<1 ppm). About 1,800 mL DIUF water is used. The washed powder is dried and calcined in air as follows: 5° C./min ramp from 22° C. to 110° C., hold at 110° C. for 2 h, ramp 2° C./min from 110° C. to 550° C., hold at 550° C. for 8 h, cool to room temp.

The calcined powder is placed in a vertical quartz tube that is heated with an electric tube furnace and is treated with a gas (5 vol. % hydrogen in nitrogen) at 100° C. for 8 h. The reduced powder turns from dark grey to black. The material obtained is designated as Catalyst B. Catalyst B contains 0.99 wt. % Pd, 0.46 wt. % Au, and 0.16 wt. % Na. Chloride level is less than 10 ppm. The nitrogen BET surface area is 64 $m^2/g$.

EXAMPLE 3

Pd/Au-on-Titania (Catalyst C)

An aqueous $Na_2PdCl_4$ solution (19.74 wt. %, 2.78 g), an aqueous $NaAuCl_4$ solution (19.95 wt. %, 10.0 g), and DIUF water (deionized and ultrafiltered, obtained from Fisher, 250 g) are charged in a 500-mL round bottom flask. The above mixture is placed on a rotovap and mixed at 30 rpm for 0.5 h. To this solution, titania powder (DT-51D, Millennium Chemicals, 1.4 micron, 100 g) is added. Additional DIUF water (20 g) is used to rinse residual titania from the funnel into the solution. The slurry is mixed for 15 min at 40° C.

To this slurry, $NaHCO_3$ (15.1 g) is added while it is mixed to raise the pH to 7.1. Gaseous $CO_2$ is emitted from the solution during the addition. The flask is then rotated at 30 rpm and 40° C. for 22 h while the flask is vented to atmosphere. Filtering the above slurry, followed by rinsing with DIUF water (100 g) gives a dark grey powder. The power is dried in an oven at 60° C. for 21 h under a nitrogen purge, then further dried at 60° C. for 7.5 h under vacuum. The dried powder is calcined in a muffle furnace in air using the temperature program: 5° C./min ramp from 22° C. to 110° C., hold at 110° C. for 2 h, ramp 2° C./min from 110° C. to 400° C., hold at 400° C. for 8 h, cool to room temp. The calcined powder is placed on a pressure filter with 0.22 micron filter paper and washed with DIUF water until no chloride is detected in the washing solution (Cl<1 ppm). About 5.2 L DIUF water is used. The washed powder is dried and calcined in an air as follows: 5° C./min ramp from 22° C. to 110° C., hold at 110° C. for 2 h, ramp 2° C./min from 110° C. to 550° C., hold at 550° C. for 8 h, cool to room temp.

The calcined powder is placed in a vertical quartz tube that is heated with an electric tube furnace and is treated with a gas (5 vol. % hydrogen in nitrogen) at 100° C. for 8 h. The reduced powder turns from dark grey to black. The material obtained is designated as Catalyst C. Catalyst C contains 0.48 wt. % Pd, 1.9 wt. % Au, <20 ppm Cl, and 0.24 wt. % Na. The nitrogen BET surface area is 40 $m^2/g$.

EXAMPLE 4

Extrudate Containing TS-1 and Pd/Au-on-Titania (Catalyst D)

Titanium silicalite-1 (TS-1) is prepared by following procedures disclosed in U.S. Pat. Nos. 4,410,501 and 4,833,260, and calcined in air at 550° C.

TS-1 (61.1 g), Catalyst B prepared in Example 2 (6.13 g), carboxymethylcellulose sodium salt (high viscosity, Aldrich, 2.85 g), and poly(ethylene oxide) (Aldrich, 100,000 MW, 0.97 g) are mixed in a plastic beaker and transferred to a clean dry ball mill with zirconia beads. The ball mill is sealed and rolled at 60 rpm for 1 h. The powder is transferred to the Brabender Prep-Mixer-Muller fitted with Sigma blades which is rotating at 30 rpm for 13 min at 23° C. A sample of Polymer A-1 (17 g) is added to the mixture in the muller while the blade is rotating at 30 rpm. Then LUDOX AS-40 silica sol (Aldrich, 40 wt. % silica, 39.52 g) is added to the muller. After another 5 min of mulling, DIUF water (16.5 g) is added to the muller. It is then mixed for another 8 min at 30 rpm. The motor load is 3 A. The resulting paste, which is homogeneously grey in color, is removed and placed in a plastic bag. The paste ages at room temperature in the bag for 3 days.

The aged paste is extruded using a Brabender single screw, ¾", L/D=10:1, 3:1 screw pitch extruder fitted with a 1/16" single die. The paste is added to the feed hopper and pushed into the screw with a Teflon rod. The extrusion is operated at 10 rpm at 23° C. The pressure in the extruder head is at about 50-150 psig. The extrudates are collected in a glass tray. The grey extrudates are dried at room temperature in air overnight, at 63° C. for 4 h under vacuum, and calcined in a muffle furnace in air at 550° C. for 8 h (temperature ramp rate 2-5° C./min).

The extrudates are reduced at 110° C. under a gas flow (5 vol. % hydrogen in nitrogen) for 8 h in a quartz tube heated by a vertical electric tube furnace. The grey extrudates (Catalyst D) contains 0.08 wt. % Pd, 0.03 wt. % Au, 0.22 wt. % Na, <100 ppm Al, <0.1 wt. % C, and <0.1 wt. % N. The nitrogen BET surface area is 320 $m^2/g$. Its crush strength is 2.31 lbs. The crush strength is measured by using Chatillon-Antek DFS Digital Force Gauge, fitted with flat platens on an MT test stand using an average of 10 extrudates that ranges in length from 5 to 8 mm. The DFS gauge is set in the "Break Detect" Mode which stores the maximum force (in lbs) exerted before the extrudate breaks. The force exerted for total extrudate crush is recorded as described in ASTM D 4179-01.

EXAMPLE 5

Extrudate Containing TS-1 and Pd/Au-on-Titania (Catalyst E)

TS-1 (132.38 g), Catapal 200 Bohemite alumina (Sasol, 52.41 g), Catalyst C prepared in Example 3 (17.34 g), aluminum phosphate (Alfa, 96% purity, 5.65 g), carboxymethylcellulose sodium salt (high viscosity, Aldrich, 7.61 g), and poly(ethylene oxide) (Aldrich, 100,000 MW, 2.54 g) are mixed in a 500-mL plastic beaker. The mixture is then poured into a Brabender muller fitted with lightly oiled Sigma blades rotating at 10 rpm and mixed for 5 min. An acetic acid solution made by mixing DIUF water (51 g) and glacial acetic acid (13.8 g) is added over 5 min to the muller containing the dry mixed powder. After being mixed at 10 rpm for 5 min, a sample of Polymer A-1 (19.3 g) and additional DIUF water (30 g) and glacial acetic acid (7.2 g) is added. The mixture is mulled for 15 min. The paste is aged in a plastic bag for 24 h at room temperature.

The aged paste is extruded using a Brabender single screw, ¾", L/D=10:1, 3:1 screw pitch extruder fitted with a 1/16" single die. The paste is added to the feed hopper and pushed into the screw with a Teflon rod. The extrudates are collected in a glass tray. The extrudates are purged with a flow of nitrogen in an oven at 70° C. for 60 h. The extrudates are dried in a muffle furnace in air at 110° C. for 4 h, then calcined at 550° C. for 12 h (temperature ramp rate 2° C./min). The extrudate (Catalyst E) has a crush strength of about 2.85 lbs.

COMPARATIVE EXAMPLE 6

Attempt to Prepare Extrudate Containing TS-1 and Pd/Au-on-Titania

Catapal D Bohemite alumina powder (Sasol, 42 g), glacial acetic acid (5.2 g), and DIUF water (80 g) is mixed for 5 min, a grey thick sol is formed. Into the sol, a mixture of TS-1 (60 g) and Catalyst B (8.1 g) is added. A thick grey paste resulted which is transferred to the Prep-Mixer Muller with oiled Sigma blades. Na-carboxymethylcellulose sodium salt (5 g) and PEO (100,000 MW, 1.05 g) is added to the mixer; it is then mixed at 5 rpm for 4 min and at 10 rpm for 3 min. The paste is not homogeneous and sticks to the blades. The muller speed is then increased to 15 rpm after which about 5 mL of DIUF water and 2 mL of concentrated NH$_4$OH is added to the paste. The muller speed is increased to 20 rpm for a few minutes and then to 25 rpm. After a few more minutes the mulling is stopped. The paste formed is not homogeneous in water content and it is not extrudable.

EXAMPLE 7

Extrudate Containing TS-1 and Pd/Au-on-Titania (Catalyst F)

Catapal D alumina (16.8 g) and Catalyst B (3.3 g), TS-1 (24 g) are mixed into a plastic beaker. The mixture is mixed with the paste from Example 4, and transferred to the Prep-Mixer Muller with oiled Sigma blades which turned at 10 rpm. Into the muller, glacial acetic acid (2.3 g) and Polymer A-1 (10 g) are added. The muller speed is increased to 20-25 rpm. The paste obtained is stored in a plastic bag for 4 h.

The paste is readily extruded in a Brabender extruder with ¾" single screw (10:1) and 1/16" single hole die. The extrudates are dried in air overnight, then at 60° C. in a vacuum oven for 24 h. It is then calcined in air with the temperature program: 20 to 100° C. at 5° C./min, hold for 2 h, 110° C. to 550° C. at 2° C./min, hold for 8 h, cool. The extrudates are reduced at 110° C. under a gas flow (5 vol. % hydrogen in nitrogen) for 6.5 h in a quartz tube heated by a vertical electric tube furnace. Catalyst F is obtained. Its crush strength is 10 lbs. The tap density is 0.68 g/mL and the wt. % attrition (measured with ASTM D4058-96, except with 50 g extrudates) is 1.72%. The nitrogen BET surface area is 320 m$^2$/g.

The example shows that using the comb-branched polymer as extrusion aid, a mixture of TS-1 and Pd/Au-on-titania can be successfully extruded using an alumina binder.

EXAMPLE 8

Propylene Epoxidation with Catalyst D

Catalyst D (prepared in Example 4) is tested in a fixed-bed Robinson-Mahoney basket reactor (available from Autoclave-Engineering) in a continuous gas flow and liquid flow mode for epoxidation of propylene.

Catalyst D (1/16" in diameter, ¼" in lengths, 20 g) and rutile extrudates (inert diluent, surface area 2 m$^2$/g, 1/16" in diameter ¼" in length) are mixed and charged into a stainless steel mesh basket (50 mL in volume). Enough rutile extrudates are used to fill the basket in order to minimize movement of the bed upon agitation. An agitator shaft runs through the middle of the stationary basket. The agitator typically runs at 500 to 1200 rpm to ensure proper back-mixing of gas and liquid with the catalyst. The basket and agitator are attached to the reactor head which is then bolted to the reactor body which is pre-filled with methanol/DIUF water (80/20 weight ratio, 450 mL) containing 0.008 molar ammonium dihydrogen phosphate. A gas feed (4.5 mol. % oxygen, 2.25 mol. % hydrogen, 86.4 mol. % nitrogen, 6.36 mol. % propylene, 0.45 mol. % methane) is then flowed through the reactor (flow rate 6670 mL per min). Electronic mass flow controllers are used for the gases and a HPLC piston type pump is used to pump the solvent/buffer solution. Dip tubes direct the gas and liquid feed flow to below the catalyst basket where they pass through metal fritted filters to break up gas bubbles upon entering the reaction solution. The reactor pressure is 500 psig. The reactor product gas and liquid exit the reactor through fritted metal filters attached to vent lines which then go to a gas/liquid separator. The gas is then directed to an on-line gas chromatograph (GC) for analysis and the liquid is also injected on both on-line and off-line GC. Negligible attrition of the catalyst is observed during 263 h test. Results are shown in Table 1. The catalyst productivity is defined as the grams of propylene oxide (PO) formed (including PO which is subsequently reacted to form PO derivatives) per gram of catalyst per hour. PO and PO equivalent, POE (mole)=moles of PO+moles of PO units in the PO derivatives. PO/POE= (moles of PO)/(moles of POE)×100. Propylene to POE selectivity=(moles of POE)/(moles of propane formed+moles of POE)×100. Minimal catalyst attrition or crushing occurred during this run.

EXAMPLE 9

Propylene Epoxidation with Catalyst F

The procedure of Example 8 is repeated except Catalyst F is used instead of Catalyst D. Results are shown in Table 1. Negligible attrition of the catalyst is observed during 235 h test.

TABLE 1

Propylene Epoxidation

| | Example | |
|---|---|---|
| | 8 | 9 |
| Catalyst | Catalyst D | Catalyst F |
| Catalyst productivity (%) | 0.11 | 0.05 |
| PO/POE selectivity (%) | 80-88 | 73 |
| Propylene to POE selectivity (%) | 80-90 | 77-84 |

We claim:

1. A catalyst comprising a transition metal zeolite and a noble metal, wherein the catalyst is prepared by an extrusion method using a comb-branched polymer as an extrusion aid.

2. The catalyst of claim 1 wherein the transition metal zeolite is a titanium zeolite.

3. The catalyst of claim 1 wherein the transition metal zeolite is TS-1.

4. The catalyst of claim 1 wherein the comb-branched polymer comprises recurring units of an ethylenic carboxylic monomer and a polyether macromonomer.

5. The catalyst of claim 4 wherein the ethylenic carboxylic monomer is an acrylic monomer.

6. The catalyst of claim 1 wherein the noble metal is selected from the group consisting of gold, silver, platinum, palladium, iridium, ruthenium, osmium, and mixtures thereof.

7. The catalyst of claim 1 further comprising an inorganic oxide.

8. The catalyst of claim 7 wherein the inorganic oxide is a titania.

9. A method for preparing the catalyst of claim 7, comprising
   a. extruding a mixture comprising the transition metal zeolite, the noble metal, the inorganic oxide, and the comb-branched polymer to produce a polymer-containing extrudate, wherein the noble metal is supported on the inorganic oxide;
   b. calcining the polymer-containing extrudate in an oxygen-containing atmosphere.

10. The method of claim 9 wherein the mixture further comprises a solvent.

11. A method for preparing the catalyst of claim 1, comprising
    a. extruding a mixture comprising the noble metal, the transition metal zeolite, and the comb-branched polymer to produce a polymer-containing extrudate; and
    b. calcining the polymer-containing extrudate in an oxygen-containing atmosphere.

12. The method of claim 11 wherein the mixture further comprises a solvent.

13. The method of claim 11 wherein the noble metal is supported on the transition metal zeolite.

14. The method of claim 13 wherein the mixture further comprises a solvent.

15. A method for preparing the catalyst of claim 1, comprising
    a. extruding a mixture comprising the transition metal zeolite and the comb-branched polymer to produce a polymer-containing extrudate;
    b. calcining the polymer-containing extrudate in an oxygen-containing atmosphere to produce a calcined extrudate; and
    c. supporting the noble metal on the calcined extrudate.

16. The method of claim 15 wherein the mixture further comprises a solvent.

17. An epoxidation process comprising reacting an olefin, hydrogen, and oxygen in the presence of the catalyst of claim 1.

18. The process of claim 17 wherein the olefin is propylene.

19. The process of claim 17 wherein the catalyst is in a fixed bed.

20. The process of claim 17 wherein the transition metal zeolite is TS-1.

21. The process of claim 17 wherein the catalyst is prepared by a method comprising
    a. extruding a mixture comprising the noble metal, the transition metal zeolite, and the comb-branched polymer to produce a polymer-containing extrudate, wherein the noble metal is supported on the transition metal zeolite; and
    b. calcining the polymer-containing extrudate in an oxygen-containing atmosphere.

22. The process of claim 17 wherein the catalyst is prepared by a method comprising
    a. extruding a mixture comprising the transition metal zeolite, the noble metal, the comb-branched polymer, and an inorganic oxide to produce a polymer-containing extrudates, wherein the noble metal is supported on the inorganic oxide; and
    b. calcining the polymer-containing extrudate in an oxygen-containing atmosphere.

23. The process of claim 17 wherein the catalyst is prepared by a method comprising
    a. extruding a mixture comprising the transition metal zeolite and the comb-branched polymer to produce a polymer-containing extrudate;
    b. calcining the polymer-containing extrudate in an oxygen-containing atmosphere to produce a calcined extrudate; and
    c. supporting the noble metal on the calcined extrudate.

* * * * *